(12) United States Patent
Robertson et al.

(10) Patent No.: US 7,610,333 B2
(45) Date of Patent: Oct. 27, 2009

(54) METHOD AND APPARATUS FOR OPERATING A COMPUTER NETWORK

(75) Inventors: Derrick D Robertson, Woodbridge (GB); Paul F McKee, Colchester (GB)

(73) Assignee: British Telecommunications plc, London (GB)

( * ) Notice: Subject to any disclaimer, the term of this patent is extended or adjusted under 35 U.S.C. 154(b) by 332 days.

(21) Appl. No.: 10/539,413

(22) PCT Filed: Dec. 11, 2003

(86) PCT No.: PCT/GB03/05396

§ 371 (c)(1),
(2), (4) Date: Jun. 17, 2005

(87) PCT Pub. No.: WO2004/059529

PCT Pub. Date: Jul. 15, 2004

(65) Prior Publication Data

US 2006/0149836 A1     Jul. 6, 2006

(30) Foreign Application Priority Data

Dec. 31, 2002    (GB) ................................ 0230331.1

(51) Int. Cl.
*G06F 15/16* (2006.01)
(52) U.S. Cl. ................. 709/203; 709/201; 709/202; 709/225
(58) Field of Classification Search ................ 709/202, 709/203
See application file for complete search history.

(56) References Cited

U.S. PATENT DOCUMENTS 5,423,037 A    6/1995    Hvasshovd
5,442,791 A    8/1995    Wrabetz (Continued)

FOREIGN PATENT DOCUMENTS

EP    1248441 A2    10/2002

(Continued)

OTHER PUBLICATIONS

International Search Report dated Nov. 2, 2004.

(Continued)

*Primary Examiner*—Matthew D Anderson
*Assistant Examiner*—Adel Youssef
(74) *Attorney, Agent, or Firm*—Nixon & Vanderhye PC

(57) ABSTRACT

Messages are generated by a first device which messages together have the purpose of identifying a predetermined number of devices which satisfy a test condition included in each message. These messages are sent respectively to on-line devices neighboring the first device. To ensure that no more devices than necessary are identified by the messages, each message includes a variable which is referred to as a token bucket which indicates the number of devices to be discovered by the message. Additionally, each message includes a unique identifier. When one device receives a discovery message sent from another device, it determines if it satisfies the test condition and if so it sends an acceptance message to the originating device, decrements the token bucket in the message and forwards on any remaining tokens to another neighbor. The process stops once all tokens have been disposed of in this way. If a message reaches the end of a path without disposing of all of the tokens, the message is returned back up the path to try different paths until eventually all paths have been tried or a restriction criterion e.g., maximum permitted number of hops) is met whereupon the message is returned back as a failed message to the originating device.

10 Claims, 4 Drawing Sheets

U.S. PATENT DOCUMENTS

| | | | |
|---|---|---|---|
| 5,732,397 | A | 3/1998 | Detore |
| 5,745,687 | A | 4/1998 | Randell |
| 5,774,668 | A | 6/1998 | Choquier et al. |
| 5,790,848 | A | 8/1998 | Wlaschin |
| 5,978,791 | A | 11/1999 | Farber |
| 6,128,590 | A | 10/2000 | Stadel et al. |
| 6,249,844 | B1 | 6/2001 | Schloss |
| 6,272,612 | B1 | 8/2001 | Bordaz |
| 6,330,621 | B1 | 12/2001 | Bakke et al. |
| 6,336,177 | B1 | 1/2002 | Stevens |
| 6,353,608 | B1 | 3/2002 | Cullers et al. |
| 6,463,457 | B1 | 10/2002 | Armentrout et al. |
| 6,505,283 | B1 | 1/2003 | Stoney |
| 6,605,286 | B2 | 8/2003 | Steidler |
| 6,631,449 | B1 | 10/2003 | Borrill |
| 6,662,235 | B1 | 12/2003 | Callis et al. |
| 6,801,949 | B1 * | 10/2004 | Bruck et al. ............ 709/238 |
| 6,871,219 | B2 | 3/2005 | Noordergraaf |
| 6,898,634 | B2 | 5/2005 | Collins |
| 6,961,539 | B2 | 11/2005 | Schweinhart et al. |
| 7,062,556 | B1 | 6/2006 | Chen et al. |
| 7,069,295 | B2 | 6/2006 | Sutherland et al. |
| 7,127,606 | B2 | 10/2006 | Wheeler et al. |
| 7,296,221 | B1 * | 11/2007 | Treibach-Heck et al. .... 709/225 |
| 7,434,257 | B2 | 10/2008 | Garg et al. |
| 2001/0034709 | A1 * | 10/2001 | Stoifo et al. ............... 705/51 |
| 2001/0034791 | A1 * | 10/2001 | Clubb et al. ............. 709/238 |
| 2002/0002577 | A1 | 1/2002 | Garg et al. |
| 2002/0099815 | A1 | 7/2002 | Chatterjee et al. |
| 2002/0114341 | A1 | 8/2002 | Sutherland et al. |
| 2002/0129248 | A1 * | 9/2002 | Wheeler et al. ............ 713/170 |
| 2002/0138659 | A1 | 9/2002 | Trabaris et al. |
| 2003/0032391 | A1 * | 2/2003 | Schweinhart et al. ...... 455/12.1 |
| 2003/0061491 | A1 | 3/2003 | Jaskiewicz et al. |
| 2005/0022014 | A1 * | 1/2005 | Shipman ................ 713/201 |
| 2005/0257220 | A1 | 11/2005 | McKee |
| 2006/0117046 | A1 | 6/2006 | Robertson et al. |

FOREIGN PATENT DOCUMENTS

| | | |
|---|---|---|
| JP | 2002-027375 A | 1/2002 |
| WO | 98/09402 | 3/1998 |
| WO | WO 99/44334 | 9/1999 |
| WO | WO 02/29551 A3 | 4/2002 |
| WO | 03/069480 A1 | 8/2003 |
| WO | 2004/001598 A2 | 12/2003 |

OTHER PUBLICATIONS

UK Search Report dated Jun. 18, 2003.

Smithson et al., "Engineering An Agent-Based peer-to-peer Resource Discovery System", Agents and Peer-To-Peer Computing, First International Workshop, AP2PC 2002. Revised and Invited Papers (Lecture Notes In Artificial Intelligence vol. 2530), Springer-Verlag Berlin, Germany, Jul. 15, 2002, pp. 69-80.

Robertson et al., "Persistent, Reliable, Decentralised File System—DFS", LCS2002-Proceeddings, 'Online?Sep. 9, 2002, pp. 104 XP002302658.

Ramanathan et al., "Finding Good Peers in Peer-to-Peer Networks", Parallel and Distributed Processing Symposium., Proceedings International, IPDPS 2002, Abstracts and CD-ROM-FT. Lauderdale, FL. USA Apr. 15-19, 2002, Los Alamitos, CA, USA, IEEE Comput. Soc. 8US, Apr. 15, 2002, pp. 232-239.

Rowstrom et al., "Storage Management and Caching in PAST, a Large-Scale, Persistent Peer-to-Peer Storage Utility", Operating Systems Reviews ACM, USA, vol. 35, No. 5, Oct. 21, 2001, pp. 188-201.

Weatherspoon et al., "Silverback: A Global-Scale Archival System", Internet, 'Online? Mar. 2001, pp. 0-15.

International Search Report - Nov. 2, 2004.

UK Search Report - Jun 18, 2003.

Robertson et al., "Persistant, Reliable, Decentralised File System—DPS", LCS2002 Proceedings, 'Online?, Sep. 9, 2002, pp. 1-4, XP002302658.

Rowstron et al., "Storage Management and Caching in PAST, A Large-Scale, Persistent Peer-to-Peer Storage Utility", Operating Systems Review ACM USA, vol. 35, No, 5, Oct. 21, 2001, pp. 188-201, XP002302659.

Devarakonda, et al., "A Policy-Based Storage Management Framework," *IEEE Proceedings of the Third International Workshop on Policies for Distributed Systems and Networks (POLICY '02)*, 4 pages, Apr. 2002.

Devarakonda, et al., "A Toolkit-Based Approach to Policy-Managed Storage," pp. 89-92, Apr. 2003.

Hoile, et al., "Core Specification and Experiments in DIET: A Decentralised Ecosystem-inspired Mobile Agent System," *AAMAS'02*, pp. 623-630, Jul. 2002.

Rabin, "Efficient Dispersal of Information for Security, Load Balancing, and Fault Tolerance," *J. Assn. Comp. Mach.*, vol. 35, No. 2, pp. 335-348, Apr. 1989.

Fisher, et al., "Policy Based Management of Large Distributed Systems," 4 pages, Oct. 2001.

Prnjat, et al., "Policy-based Management for ALAN-Enabled Networks," 12 pages, Jun. 2002.

Carlson, et al., "Policy-based Storage Management," Storage Networking Industry Association (SNIA), pp. 1-10, Aug. 2000.

Gelb, "System-managed storage," *IBM Systems Journal*, vol. 28, No. 1, pp. 77-103, 1989.

Sean Rhea, Chris Wells, Patrick Eaton, Dennis Geels, Ben Zhao, Hakim Weatherspoon, and John Kubiatowicz, "Maintenance-Free Global Data Storage," Sep., Oct. 2001, IEEE International Computing, http://computer.org/internet/, 1089-7801/01.

* cited by examiner

METHOD AND APPARATUS FOR OPERATING A COMPUTER NETWORK

This application is the US national phase of international application PCT/GB2003/005396 filed 11 Dec. 2003 which designated the U.S. and claims benefit of GB 0230331.1, dated 31 Dec. 2002, the entire content of which is hereby incorporated by reference.

BACKGROUND

1. Technical Field

The present invention relates to a method and apparatus for operating a computer network and in particular to a method of storing data in a distributed manner on such a network.

2. Related Art

The present inventor has recently described the benefits of storing computer data files in a distributed manner and has proposed a reliable data archival system based on this principle, in a paper entitled "Persistent, Reliable, Decentralised File System—DFS" published in the proceedings from the London Communications Symposium 2002, a copy of which is appended to this document as APPENDIX I. In this proposal, a data file to be stored in the distributed archive is firstly divided up into a plurality, k, of equally sized portions and then these are converted into a second larger plurality, n, of fragments by means of an "erasure code (k,n)" such that any k of the n fragments can be used to recover the original k portions and hence the complete data file.

The proposed data archive system is envisaged as working within a peer-to-peer or similar computer network in which computers may dynamically join and leave the network in an unpredictable manner. One requirement of the proposed scheme when operating in such a network is a discovery method for identifying which computers within the network are currently available for storing a new fragment of a data file to be archived. There are a number of discovery methods suitable for this purpose in use today, which use a variety of principles of operation; however, although these methods have various strengths which make them attractive for certain circumstances, there is still a requirement for an improved method for use in a large peer based network.

BRIEF SUMMARY

According to a first aspect of the present invention, there is provided a method of identifying a predetermined number of computers within a computer network which satisfy one or more specified conditions, the method comprising the steps of:
- a first computer communicating to one or more of the computers in the network a request message which includes said one or more specified conditions and a token value which is indicative of a number of computer devices to be located by the message;
- each subsequent computer which receives a request message processing the message by performing the following steps:
- determining if it is able to satisfy the one or more conditions specified in the request message and if so, decrementing the token value within the message, and then
- determining if the token value in the request message indicates that at least one further computer device requires locating by the message and if so, forwarding the message, or a plurality of daughter messages, on to a subsequent computer device or devices within the computer network unless a restriction criterion has been met.

This method has some important beneficial properties including the property of not requiring individual computers to store any specialist routing information for contacting remote computer devices or other specialist information about the properties of remote computers and the property of enabling only a limited amount of traffic to flow through the network, regardless of the size of the network. Each property has the benefit of enabling the method to scale to very large peer-to-peer networks.

Note that the term computer used throughout this specification is intended to denote any device capable of performing digital processing and being connected to a computer network and thus includes personal digital assistants, mobile telephones, devices including a "Bluetooth" (Registered Trade Mark of Bluetooth Company) chip, laptop computers, personal computers, mainframe computers etc.

Preferably, the method involves identifying at least two computers which satisfy the specified conditions. Preferably the conditions relate to storage capacity whereby the identified computers can then be used for storing a document in a distributed manner to enable the secure and robust storage of documents on a distributed network of computers.

According to a second aspect of the present invention, there is provided a method of storing a data file in a computer network, the method comprising the steps of:
- identifying a predetermined number of computers within a computer network which satisfy one or more specified conditions by: a first computer which has a copy of the data file to be stored communicating to one or more of the other computers in the network a request message which includes said one or more specified conditions and a token value which is indicative of a number of computer devices to be located by the message; each subsequent computer which receives a request message processing the message by performing the following steps: determining if it is able to satisfy the one or more conditions specified in the request message and if so, reporting this fact back to the first computer and decrementing the token value within the message, and then determining if the token value in the request message indicates that at least one further computer device requires locating by the message and if so, forwarding the message, or a plurality of daughter messages, on to a subsequent computer device or devices within the computer network unless a restriction criterion has been met;
- generating a first plurality, corresponding to the identified predetermined number of computers, of erasure coded fragments from the data file such that any subset of the fragments which contains at least a smaller predetermined number of the first plurality of fragments can be used to recreate the data file; and
- transmitting each of the erasure coded fragments to a respective one of the identified computers for storage thereon; wherein at least one of the one or more specified conditions is that the computer has sufficient storage space available for storing one of said fragments.

According to a third aspect of the present invention, there is provided a computer network comprising a plurality of computer devices having data connections such that each computer device within the network can communicate with any other device within the network provided both computers are running and correctly connected into the network, each device within the network comprising:
- a request generator for generating request messages each of which includes a token value indicative of the number of other devices within the network to be identified by the message and one or more specified conditions which each identified computer is to satisfy; and a request processor for processing received request messages by:

determining if it is able to satisfy the one or more conditions specified in the request message and if so, decrementing the token value within the message and identifying itself to the originator of the corresponding received request message, and then after completing the determination (whether positive or negative)

determining if the token value in the request message indicates that at least one further computer device requires locating by the message and if so, forwarding the message, or a plurality of daughter messages, on to a subsequent computer device or devices within the computer network unless a restriction criterion has been met.

According to a fourth aspect of the present invention, there is provided a computer device for forming part of a computer network comprising a plurality of computer devices having data connections such that each computer device within the network can communicate with any other device within the network provided both computers are running and correctly connected into the network, the device comprising:

a request generator for generating request messages each of which includes a token value indicative of the number of other devices within the network to be identified by the message and one or more specified conditions which each identified computer is to satisfy; and a request processor for processing received request messages by:

determining if it is able to satisfy the one or more conditions specified in the request message and if so, decrementing the token value within the message and identifying itself to the originator of the corresponding received request message, and then after completing the determination (whether positive or negative)

determining if the token value in the request message indicates that at least one further computer device requires locating by the message and if so, forwarding the message, or a plurality of daughter messages, on to a subsequent computer device or devices within the computer network unless a restriction criterion has been met.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EXEMPLARY EMBODIMENTS

Overview of the Discovery Method of the First Embodiment

Figure 1:
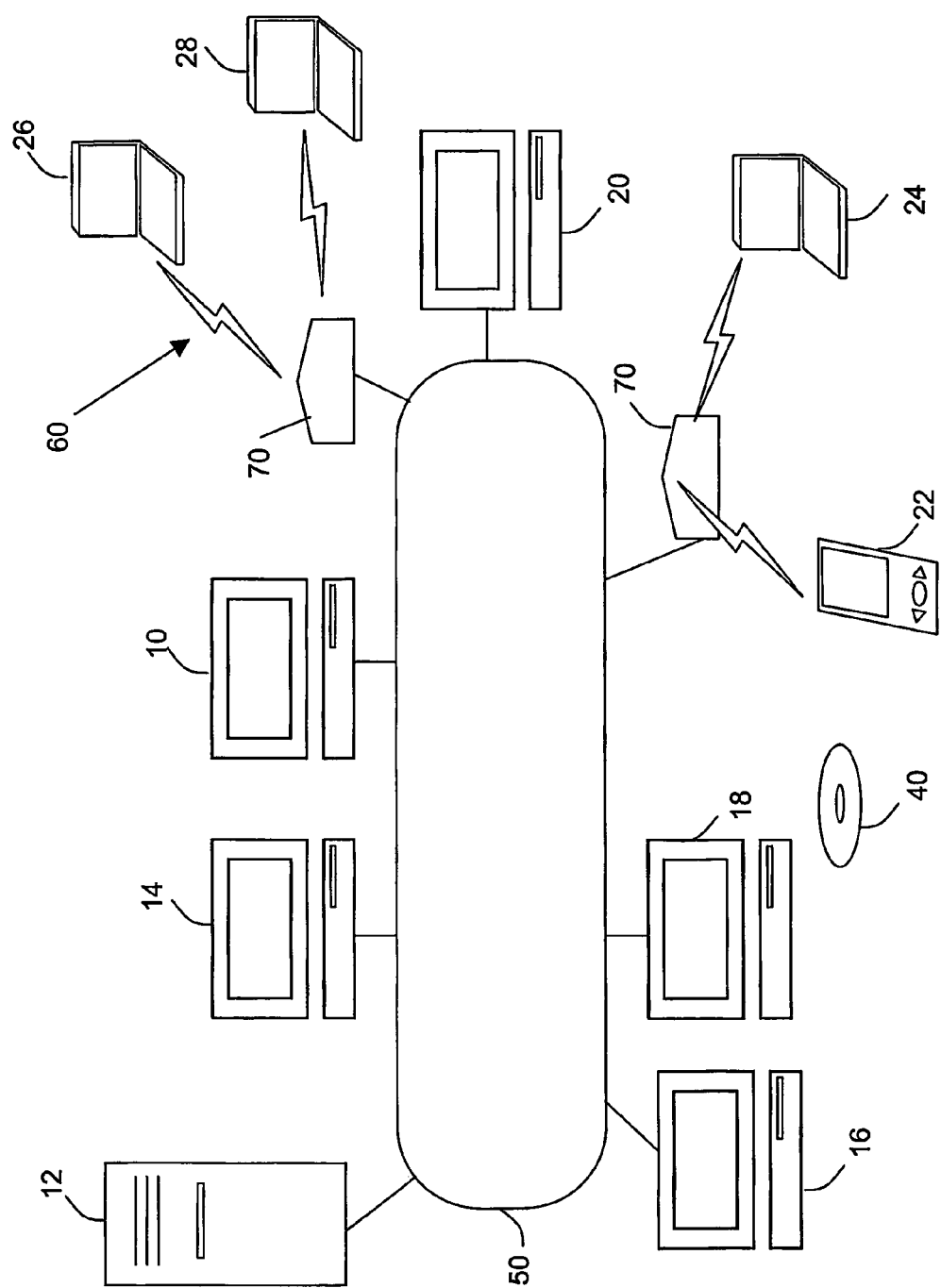
FIG. 1 is a schematic block diagram of a computer network according to the present invention.
Figure 2:
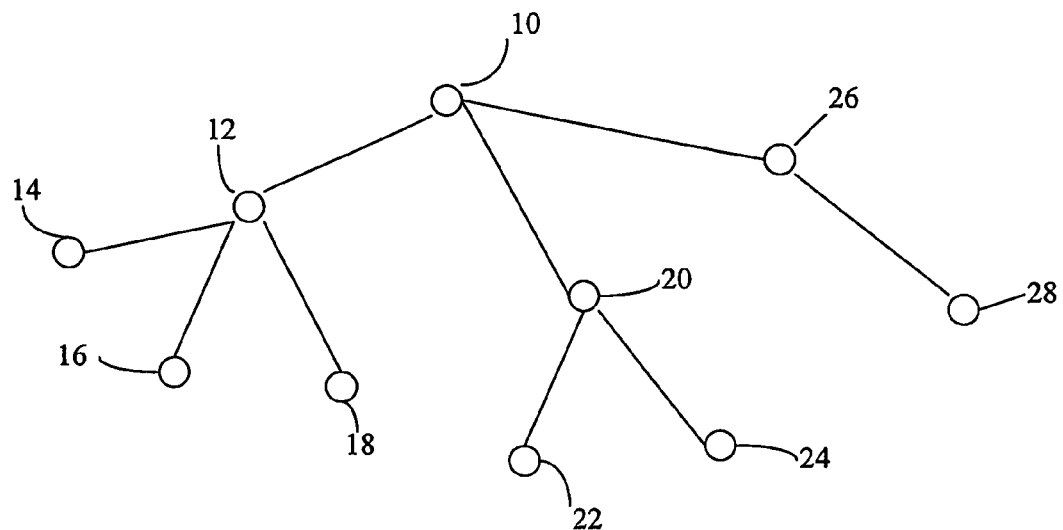
FIG. 2 is a simplified schematic diagram of the computer network of FIG. 1 illustrated from the point of view of one of the computers within the network of FIG. 1.

The discovery method of the first embodiment is applicable to a computer network such as that diagrammatically illustrated in FIG. 1. In the computer network of FIG. 1, each device 10-28 is connected, via an Ethernet connection 50, to each other device 10-28 (since, as shown in FIG. 1, all of these devices are currently switched on, connected to the network and are participating in the discovery method, ie they are "on-line"). Note that some of the devices 22, 24, 26, 28 are connected over an air-interface 60 via a wireless hub 70 to the network 50. Also note that FIG. 1 illustrates a compact disk storage device 40 which carries the necessary software for implementing the present embodiment and the contents of which may be read directly or indirectly by any of the devices connected to the network.

In order to store information in a distributed manner, according to the present embodiment, a device (eg desktop computer 10) divides up the data file to be stored into a plurality of fragments and then tries to identify enough on-line devices with sufficient capacity to store a single fragment each. This process of identifying suitable on-line devices is referred to as "discovery" and as an example, consider the case in which device 10 seeks to discover 6 on-line devices capable of storing one fragment each, which example is illustrated in FIGS. 2 to 5.

FIGS. 2 to 5 illustrate the same network as that shown in FIG. 1 but re-drawn to illustrate the configuration of an "overlay" network used by the devices when generating or processing requests concerning the discovery process. This overlay network is referred to as an application layer network because the discovery application enforces the restrictions of the overlay network (on which devices may communicate directly with which other devices) despite the underlying layers (ie the transport/network layers) not being so restricted (as illustrated in FIG. 1, each online device at the network/transport layer may communicate directly with any other on-line device via the Ethernet 50). The reason for imposing the overlay network is to improve the efficiency with which the discovery process is performed. The manner in which the overlay network is created is discussed in greater detail below.

Figure 3:
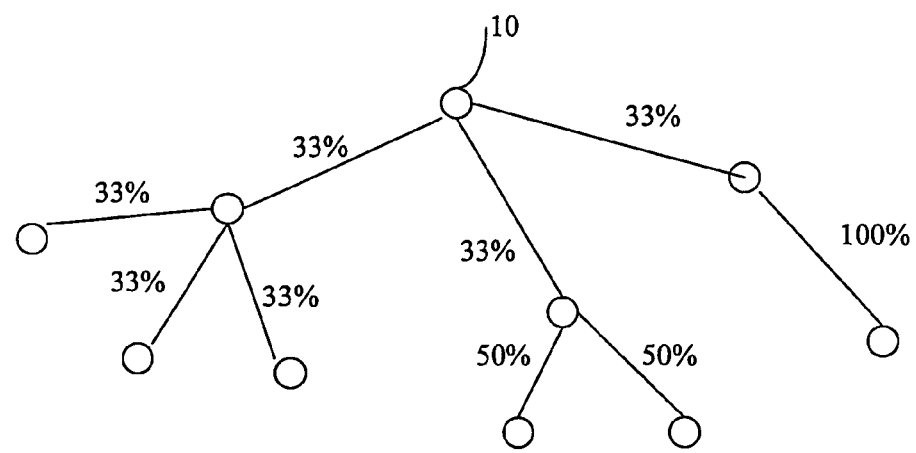
FIG. 3 is a schematic diagram similar to FIG. 2 showing the original assignment of probabilities to paths assigned by devices within the network.
Figure 4:
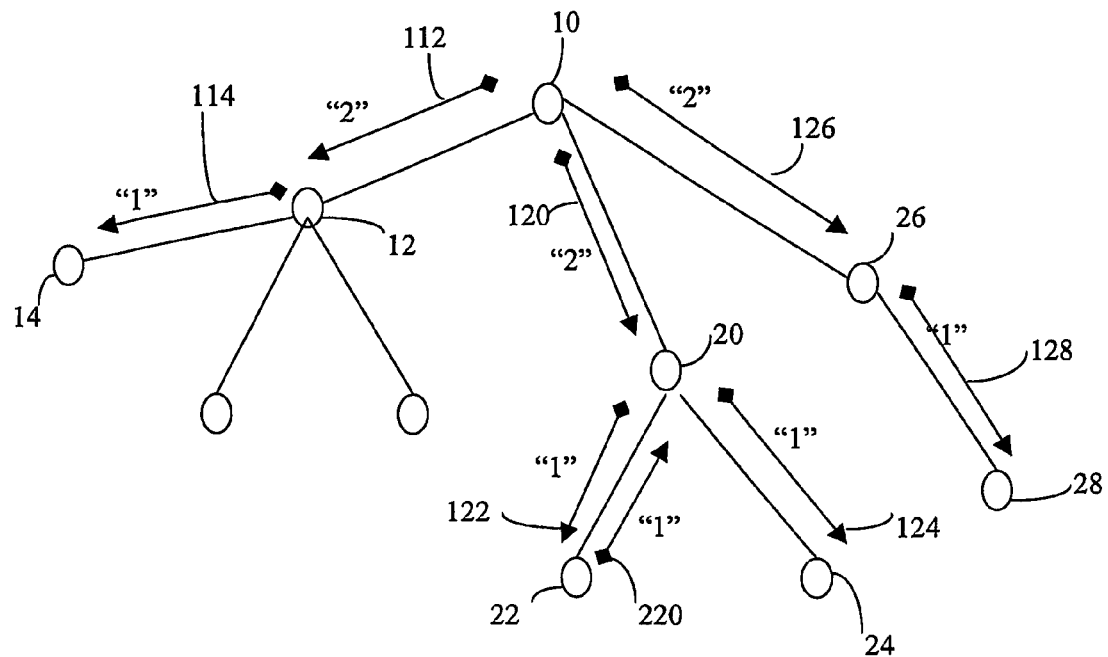
FIG. 4 is a schematic diagram similar to FIGS. 2 and 3 illustrating a single discovery process.

In overview, the discovery process of the present embodiment as illustrated with the example of FIG. 4 comprises the device 10 generating three messages 112, 120 126 each of which has the purpose of identifying two suitable on-line devices to which device 10 may distribute a fragment. These messages are sent 20 respectively to the three on-line devices 12, 20, 26 neighbouring device 10 (according to the overlay network—two devices are said to be neighbouring if the overlay network permits them to communicate directly with one another as illustrated by a line connecting the two devices in FIGS. 2 to 5, the term is only used with respect to the overlay network because at the transport/network layer all devices would be neighbouring and so the term would be redundant). To ensure that no more devices than necessary are identified by the messages, each message includes a variable which is hereinafter referred to as a token bucket which indicates the number of devices to be discovered by the message. In this example, the token bucket of each message is set to the value of two, adding up to six devices to be discovered in total. Each message also includes one or more conditions to be satisfied by the discovered devices; in the present example, the condition to be satisfied is simply that the device should have enough space available to permit it to store a fragment of a given size (eg where each fragment has size 100 Kbytes the condition might be: disk space available for distributed storage $\geq$100 Kbytes). Additionally, each message includes a unique identifier.

When the devices 12, 20 26 receive a new discovery request message, each device processes the message in the following way:

i) firstly the device checks to see if it satisfies the condition (s) set out in the message (ie in this example it checks to see if it has fee storage space for storing distributed data $\geq$500 Kbytes); if so it goes to step ii) otherwise it jumps to step iii);

ii) if it satisfies the conditions it decrements the token bucket by one (ie in this example from two to one) and contacts the originating device (ie in this example device 10) to say that it satisfies the condition(s);

iii) the device then checks to see if the token bucket has now been decremented to zero; if so, no further action is taken, otherwise the process continues with step iv);

iv) if there is still at least one token left in the token bucket, the device forwards on the message with the (possibly decremented) token bucket to any downstream neighbouring devices (ie away from the originating device) whilst keeping a note of the identifier of the message so as to be able to recognise it if it returns back to it (thus in the present example, devices 12, 20 and 26 all decrement the token bucket by one and forward the message on with the decremented token bucket to devices 14, 22 and 28 respectively);

v) If there is still at least one token left in the bucket but no downstream neighbouring device to send it to (or if it has already tried all of its downstream neighbours), then the device passes the message back up the overlay network to the device from which it received the message in the first place (thus in the present example—see FIG. 3—device 22 does not satisfy the free storage space criterion and does not have any downstream neighbours to forward the message to, so it returns the message to device 20 which then forwards the message on to device 24 which does satisfy the necessary criterion, allowing the discovery process to come to an end).

Detailed Description of the First Embodiment

There will now be discussed in greater detail a distributed storage system utilising the discovery method described above together with some specific implementation details of the discovery method used in this system.

An account of the distributed storage system or decentralised file system in which the discovery method of the present embodiment is incorporated to form the distributed storage system of the first embodiment is described in the appended paper. As mentioned in the appended paper, a number of different erasure codes could be used for this purpose. Example erasure codes which could be used are described in N. Alon, J. Edmonds, M. Luby, "Linear Time Erasure Codes With Nearly Optimal Recovery", Proc. of the 36th Annual Symp. on Foundations of Computer Science, 1995, pp. 512-519 and a paper by John Byers, Michael Luby, Michael Mitzenmacher entitled *"Accessing Multiple Mirror Sites in Parallel: Using Tornado Codes to Speed Up Downloads"* which appears as ICSI Technical Report TR-98-021, July 1998, and is currently available for viewing at the following URL: http://www.icsi.berkeley.edu/~luby/PAPERS/mirrdown.ps. The tornado code is especially preferred because of the improved coding and decoding speeds.

In the preferred implementation of the first embodiment, the overlay network is formed using a policy based mechanism such as that described in co-pending European patent application No. EP 0254294.8. However, any appropriate method can be used such as, for example, the method described in co-pending UK patent application No. GB 0226762.3 or simply having a single master device centrally imposing a predetermined overlay network, predetermined by a human operator, on the other devices in the network by informing them as to who their neighbours are. In the present implementation, these neighbours are then stored in a first table which stores all of its known neighbours; a second table then stores details of its neighbours, which are currently on-line, together with a set of associated probabilities which reflect the anticipated relative probabilities of the associated devices successfully disposing of tokens (by identifying suitable devices). The manner in which these probabilities are used in the present embodiment is discussed in greater detail below with reference to FIGS. 3, 4 and 5.

A further enhancement to the basic discovery method which is included in the presently described implementation of the present embodiment is the inclusion of a maximum hop count in each message, which is decremented by each device which receives a new message until the hop count has reached zero whereupon the message is passed back towards the originating device. This enhancement is effective to prevent the dissemination through the entire network of a message which has, for example, too difficult a set of conditions to be satisfied.

The inclusion of probabilities, together with hop count, enables the tokens to be distributed in such a way that computing resources are quickly identified without consuming all connected nodes computing resources. If a path can not dispose of its allocated tokens, then the probability associated with this path may be modified to take this failure into account. Unused tokens are then passed back through the network until all tokens are resolved or returned to the client. This would be because the network isn't large enough to cope with the demand for all the tokens, the condition(s) or test parameter(s) is (are) unacceptable or not enough computers have been found within the radius of the hop count set by the originating device to satisfy the token bucket.

The present implementation uses software written in the java programming language to implement the above described functionality. In particular, each participating device on the network (ie each on-line device) runs a discovery algorithm or daemon (also referred to as a Discovery Strategy) which continuously waits to receive discovery request messages and responds to these messages when they are received (as will be appreciated by a person skilled in the art, this can be implemented with a runnable class which then runs as a thread which can run continuously in parallel with any number of other threads).

When a device wishes to store a data file, it is designated the client machine or client host and, once the client host has prepared the fragments to be stored, it starts to run a HostResourceDiscovery algorithm (hereinafter referred to as a HostResourceDiscovery Strategy which may again be implemented as a runnable class). The HostResourceDiscovery Strategy is responsible for making sure that either all tokens are consumed (ie that sufficient devices satisfying the message condition(s) have been identified) or ensuring that the user is made aware of the failure to identify sufficient qualifying devices (and giving the user the possibility to modify the message condition(s), if possible, to improve chances of success). There are two ways in which the HostResourceDiscovery Strategy can be triggered into reporting a failure back to the user; either it hasn't received the required number of token acceptances in a predetermined time period (this is settable by the user, in a small network such as that illustrated in FIGS. 1 to 5, a few seconds would be appropriate, in a larger network up to or even beyond a minute might be appropriate) or (and this should be the more normal method) some tokens have been returned back to the originating device with no more possible paths to try to send the tokens down.

The HostResourceDiscovery Strategy is initiated with a given size for the token bucket, n (which in the example illustrated in FIGS. 2 to 5 is given by n=6). This parameter is recorded by the HostResourceDiscovery Strategy and is compared with the total number of token acceptance messages which it has received every time a new token acceptance message is received.

The HostResourceDiscovery Strategy then initiates the discovery process, in the present embodiment, by sending a request message to the Discovery Strategy running on the client host. In the present embodiment, the message includes the following fields or parameters: previous address; target address; token bucket; test; file-name identifier; number of allowed hops; and client address). In the starting request message sent by the HostResourceDiscovery Strategy, the previous address and client address parameters are set to null (this is identified by the Discovery Strategy running on the client host which is therefore able to recognise itself as the originating device or client host). Note that the "test" field holds the condition or conditions to be met by identified devices.

As mentioned above, every host or device participating in the decentralised file system is running a discovery strategy. When the discovery strategy running on the client host receives the discovery message from the HostResourceDiscovery strategy it performs the following tasks.

The Discovery Strategy maintains two hash-map tables. The first contains all known neighbours and their over-all probabilities (note that initially the over-all probabilities are initially set to be equal, but are modified subsequently as described below). The second table contains currently on-line neighbours and normalised probabilities. Upon receipt of the discovery message, the Discovery Strategy updates its second table by determining which of its neighbours are on-line and re-calculating normalised probabilities on the basis of the over-all probabilities for these neighbours as stored in the first table.

Thereafter, the Discovery Strategy reads the values of the previous and client address parameters contained in the received discovery message and notes that these are null (thus establishing that it is the originating device), whereupon it generates one or more discovery messages to pass on to one or more of its neighbours in accordance with the probabilities contained in the second hash-map table and the value of the token bucket parameter in the received discovery message.

Figure 6:
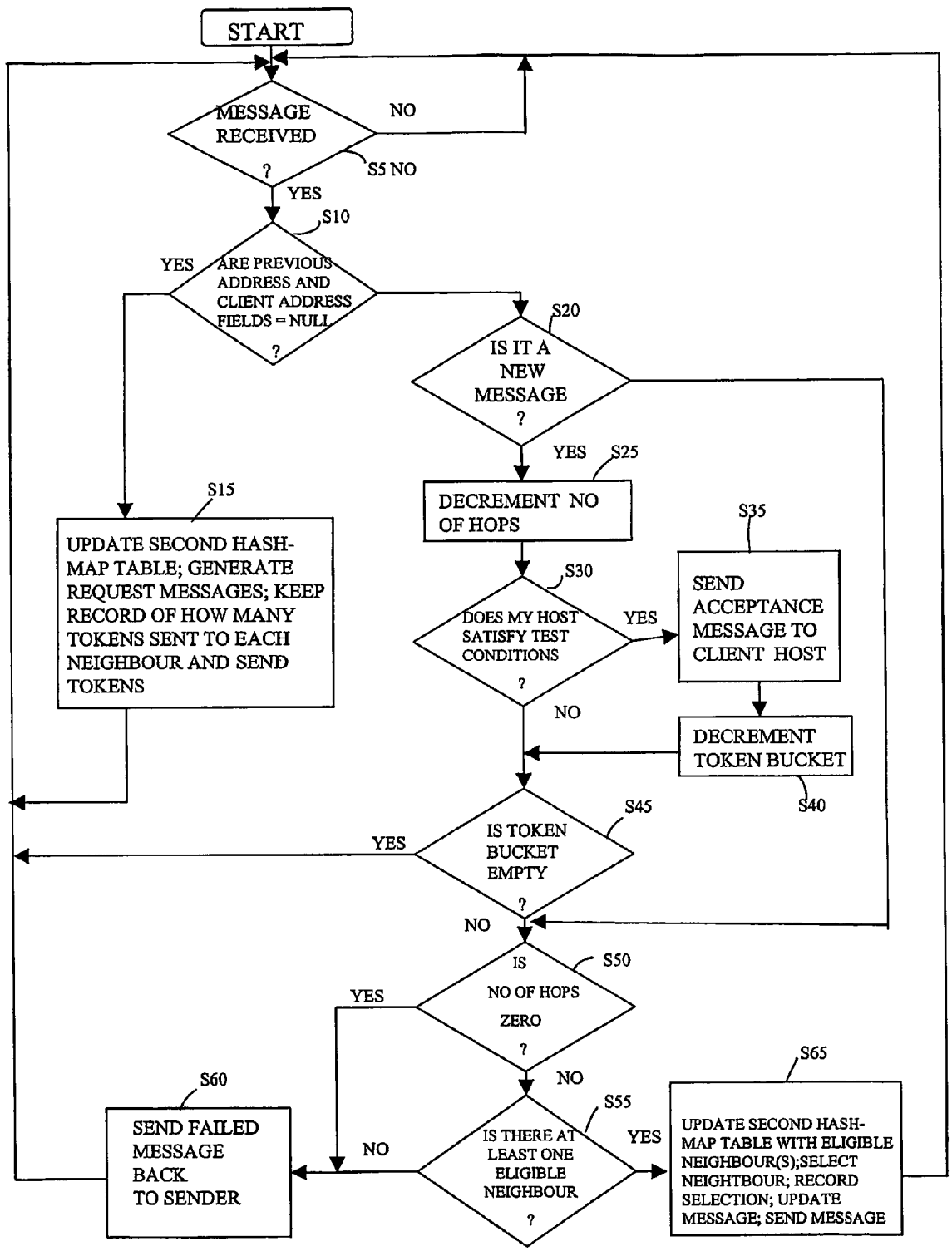
FIG. 6 is a flow chart describing the steps performed in carrying out a discovery process such as that illustrated in FIG. 4.

Thus, referring to FIG. 3, together with FIG. 6 which is a flowchart illustrating the processing performed by each Discovery Strategy, it can be seen that in the present example, after receiving a message at step S5, the device 10 determines that it is the originating device at step S10 and proceeds to step S15 in which it updates its second hash-map table by noting that it has three neighbours stored in its first hash-map table, namely server 12, desktop computer 20 and laptop computer 26, with each neighbour having an (initial) equal probability of ⅓. The Discovery Strategy then determines that all three of its neighbours are on-line and thus calculates normalised probabilities which are again therefore each equal to ⅓. Since the token bucket value is 6, it generates one message to each of its neighbours with each message having a token bucket value of 2 (where a perfect distribution is not possible a weighted random selection is made instead, eg if the token bucket value were 5 one of the neighbours would have been selected at random whose message would have a token bucket value of 1, with the other two having values of 2 each etc.). The Discovery strategy then makes a record of which neighbours it has sent tokens to and returns to step S5 to await receipt of a further message.

The newly generated messages (which now include non-null values for the previous address and client address fields) are then passed on to the respective neighbours. In the present example, this is illustrated in FIG. 4 by the arrows 112, 120, 126 marked "2" to indicate that 2 tokens are conveyed to devices 12, 20 and 26 respectively.

The Discovery Strategies running on the neighbouring devices which receive these messages (step S5) firstly note that the client address parameter is non-null (and thus determines that they are not the originating device at step S10) and then (at step S20) check to see if it is a new message (ie whether the message is heading away from the originating device or if it is a failed message returning towards the originating device). If it is a new message (which is determined by checking to see if it has a record of the filename string identifier contained in the message) it makes a note of the filename string identifier contained in the message so that it will be able to recognise returned failed messages relating to the current data file to be stored in the future, and then performs the following tasks.

Firstly (at step S25), it decrements the number of hops field by 1.

Then it determines (at step S30) whether it satisfies the condition or conditions set out in the test field in the message. If it does, it sends (at step S35) a token acceptance message back to the device indicated by the client address stored in the client address field in the request message and decrements (at step S40) the token bucket value by 1.

The Discovery Strategy then checks the token bucket value (at step S45) to establish if any further tokens need to be sent out. If the token bucket is zero the Discovery Strategy need do nothing further except await further request messages (by returning to step S5).

If, however, there are further tokens to be consumed, the Discovery Strategy checks (at step S50) that the number of hops has not yet reached zero. If it has it returns (at step S60) the message back to the neighbour from which it received the message.

If the number of hops is greater than zero, the Discovery Strategy checks (at step S55) that it has at least one eligible neighbour onto which it may forward the message (it does this by checking which of its neighbours are on-line but disregarding the neighbour who has sent it the message and any neighbours who have already tried and failed to consume the tokens—this last option applies only to old messages being re-tried). If it does have at least one eligible neighbour it updates (at step S65) its second hash-map table by checking which of its neighbours are on-line, but disregarding the neighbour who has sent the message (as determined from the previous address field of the message) and determines a normalised probability for each online neighbour in the second hash-map table. Then, in the present embodiment, the Discovery Strategy forwards on only a single message to one of the neighbours in the second table chosen at random according to the associated probabilities for each neighbour contained in the second table (ie if one neighbour had an associated probability of 75% and the other an associated probability of 25%, the first neighbour would be three times as likely to be selected as the second neighbour).

The forwarded message has the current value of the token bucket and updated values for the previous and destination address fields (indicating the current device address and the selected neighbour device address respectively). The Discovery Strategy on the current device also then makes a record of the selected neighbour and the neighbour from which it originally received the message in case it needs to use this info later for retrying failed messages. Finally the Discovery strategy returns to awaiting further messages (at step S5).

If the Discovery strategy determines either that there is no eligible neighbour to send the message on to (at step S55) or that the number of hops has been decremented to zero (at step S50), then (at step S60) the message is passed back to the sending device. If the message is a new message, this is determined from the previous address field in the message. If the message is an old message, then the sender is determined from the record maintained by the device when it first forwarded on the message.

Referring again now to FIG. 4, together with FIG. 6, it can be seen that in the present example when device 12 receives the request message indicated by arrow 112, it firstly establishes (at step S10) that it is not receiving an originating request message since the previous address and client address fields are non-null (they have device 10's address); it also checks that it is a new message (at step S20) by checking its records and noting that the file-identifier is new to it whereupon it decrements (at step S25) the number of hops field (in this example say from 5 to 4). The Discovery Strategy of device 12 then checks (at step S30) to see if it satisfies the conditions set out in the test field (in this example whether it has disk space available for storing 100 Kbytes), it determines that it does satisfy this condition and thus sends (at step S35) an acceptance message to the client host device 10 and then decrements (at step S40) the token bucket by 1; it notes (at step S45) that the token bucket still has one remaining token to be disposed of; it checks (at step S50) that the number of hops is still greater than zero (in this example it's now 4); it then determines (at step S55) that it has 3 eligible neighbours onto which it may forward the message whereupon it updates (at step S65) its second hash-map table and selects at random one of its eligible neighbours (in this case device 14) to which it sends a message indicated by arrow 114 including one remaining token left to dispose of and keeps a record of this before returning to awaiting a further request message.

Devices 20 and 26 perform similar tasks and thus send on messages indicated by arrows 122 and 128 with one token each to portable digital assistant device 22 and laptop computer device 28 respectively.

In this example, desktop computer 16 and laptop computer 28 both have sufficient storage to meet the test condition and therefore both send acceptance messages back to the client host and then perform no further processing. However, pda 22 does not satisfy the test condition (at step s30) and determines (at step S55) that it has no eligible neighbours to forward on the message to and therefore (at step S60) it returns the message back to desktop computer 20 as indicated by arrow 220 showing one token still to be disposed of.

When this returned or failed message is received by device 20, it determines (at step S20) that it is not a new message, it checks (at step S50) that the number of hops field is not zero (it is now 3) and determines (at step S55) that there is still one eligible neighbour (laptop computer 224) to send the message on to which it proceeds to do (at step S60) whilst updating its records to indicate that now it has tried neighbouring devices 22 and 24. If device 24 were not able to satisfy the test condition either, device 20 would then have to pass the failed message back up to device 10. However, in this example device 24 is able to satisfy the request and so the process comes to an end with all of the tokens having been delivered.

Figure 5:
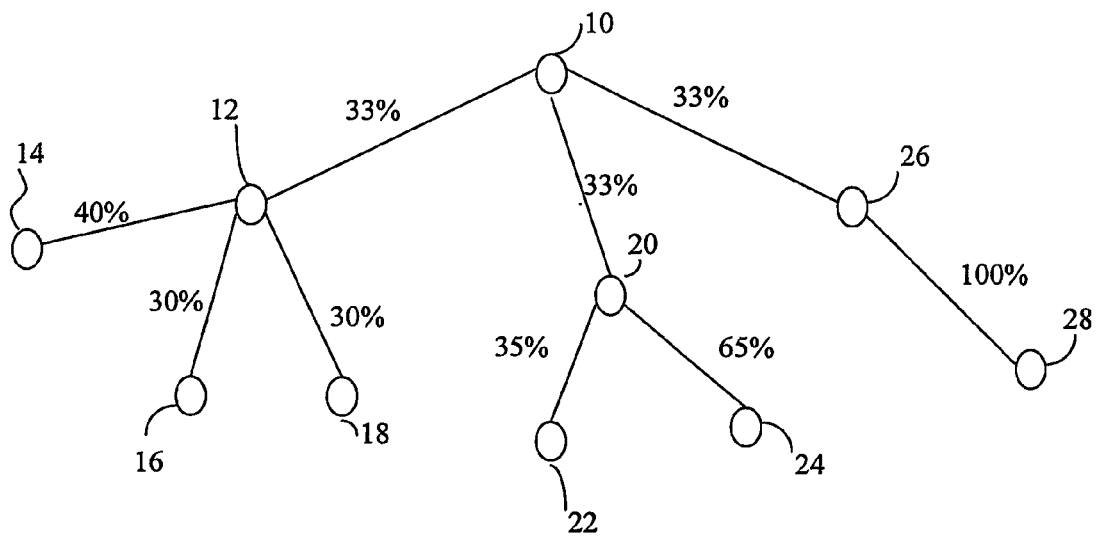
FIG. 5 is a schematic diagram similar to FIGS. 2, 3 and 4 showing the modified assignment of probabilities to paths subsequent to the discovery process illustrated in FIG. 4.

Once the distribution of tokens for a particular file identifier has been completed, in the present embodiment, the overall probabilities associated with the various paths are updated in the first hash-map table maintained by each discovery strategy. In the present embodiment, this is done by adding a finite number (eg 10) to each path which successfully disposes of a token, and subtracting the same number from any path which fails to dispose of a token and then renormalizing (if necessary). Note that in the present embodiment, the overall probabilities are stored as percentage integers. Thus, as shown in FIG. 5, none of the probabilities stored in the first hash-map table of device 10 change since of the three possible paths, each path successfully disposed of 2 tokens each. At device 12, the path to device 14 has successfully disposed of one token and thus the probability associated with this path is increased (originally 25% to each neighbour, "probability" to 14 is increased by 10 to 35, which, after re-normalisation, becomes 35/110=31% to device 14, 25/110=23% to each remaining device; if a new request were received from device 10, this would correspond to probabilities of 40% to device 14 and 30% to each of devices 16 and 18 as shown in FIG. 5). At device 20 the path to device 22 failed to dispose of a token while that to device 24 succeeded thus these probabilities are decreased and increased respectively (originally 33% each, path to 24 is increased to 43%, path to 22 is decreased to 23%; if a new request is received from device 10, this would correspond to probabilities of 65% to device 24 and 35% to device 22). In the present embodiment, the probability associated with a particular neighbour is never allowed to reduce below a small minimum to ensure that it will always be tried as a last resort.

In an alternative embodiment though, the probabilities are used to modify the overlay network with devices having low probabilities being asked to re-register with say another of the devices neighbours also having a smallish probability etc to minimise the amount of requests being sent to and from low probability devices.

Alternatives

In the above described embodiment, any one participating device was able to publish documents to the decentralised file storage system. However, one particularly useful application of this technology might be to provide a secure archive service for a large number of individuals. In such a case, the overall architecture might comprise a trusted closed network of computers, connected, via a gateway server with a secure firewall in place, to a large number of individual clients who wish to store data on the secure servers. A client with a file to be stored then sets up a secure communication with the gateway server (eg using HTTPS protocol or by sending and receiving encoded messages using an encryption such as public/private key encryption). The gateway server can then perform the fragmentation transparently to the remote client and store the fragments in a distributed manner around the secure servers in the trusted closed network. The gateway server then simply stores details of where the fragments for a particular file have been stored. This information is much less than the stored data itself and so conventional mechanisms for ensuring it is not lost can be used such as providing multiple back up copies etc.

Additional possible security enhancements are set out in APPENDIX II. Note that where the network is not trusted, one possibility is to send the clients public key with each fragment. The storing computer can then validate that a person requesting the retrieval, deletion or modification of a stored fragment is the originally publishing client by asking the requester to encode something with its private key and attempting to decode with the stored public key, etc. Additionally, a (Secure Hash Algorithm) could be used to generate a code which can be used to identify a particular fragment and detect if the fragment has been modified in any way. The codes could be stored centrally with the client (or gateway server) or they could also be stored (and possibly discovered) in a distributed manner.

In the above embodiment, only the originating client host generates multiple messages to go out to a plurality of its neighbours. However, in alternative embodiments, each discovery strategy could send out multiple messages to multiple neighbours ensuring that the token bucket is divided in a way which reflects the probabilities associated with each eligible neighbour. With such a scheme, it would be beneficial to have a facility to send returned failed messages back down paths where no failures have yet been received, possibly with a suitable delay to give all paths a reasonable time to come back with failures of their own. With such a scheme, it would be beneficial for each discovery strategy to maintain a record of acceptance messages which it has sent, at least until a corresponding fragment has finally been sent and stored by the device, to prevent the device accepting more than one token for a given file-identifier.

In the above example the test condition was that of free storage space. However, the system is applicable for discovering the availability of any resource (eg bandwidth, processing power for distributed computing applications, etc.). Furthermore, the method can be used for very different applications (eg finding likely matches for a search on a database, for connecting people with similar interests together to form a chat group, etc—the important factor being that there must be some predefined quorum number (ie the number of tokens) of items (eg matches or people) to be discovered). As another example, instead of having the client computer (or in the case of a gateway server acting on behalf of a remote client, the gateway server) storing details of where the fragments of a particular file are stored, the client could simply send out a discovery message requesting the (minimum number required to restore the file of) fragments. The test condition would then be whether or not the device is storing one of these fragments. Once discovered, the client then simply requests each discovered computer to send a copy of its stored fragment to the client.

APPENDIX I

Persistent, Reliable, Decentralised File System—DFS

Derrick Robertson, Paul McKee, Cefn Hoile

BTExact, {derrick.robertson@bt.com, paul.mckee@bt.com, cefn.hoile@bt.com}

This paper describes the architecture of a global, distributed, reliable data store. The system is based on a decentralised peer to peer network and uses cryptographic checksums to ensure validity and security and erasure codes to distribute fragments across the network to a set of peers whose attributes match the parameters specified by the user's preferences.

1. Introduction.

Moving into the $21^{st}$ century has seen the increase in both shared resources and digital data. Resources such as bandwidth, hard-disk space and computer cycles can be shared through common distributed techniques such as GRID, NAS (Network attached storage) and SAN (Storage area networking) technologies but the amount of digital information required to be stored and accessed by individuals and large companies is doubling per month. This combined knowledge pushes us away from traditional data storage methods towards more dynamic, ubiquitous archival techniques evolved from the starting point presented by Rabin's algorithm [1]. The IDA (Information dispersal algorithm) is an early demonstration of file fragmentation. This means only storing a fragment of the file on a number of machines, moving away from the mirror site ideology where the complete image of the file is available on all machines.

The functions that are sought in a data archival structure are:
1. Persistence: The data is always available until the author decides to remove the archive from the network.
2. Availability: Data is accessible 5 9's of the time.
3. Performance: System able to offer a suitable quality of service.
4. Security: Data should not be able to be modified or accessed by other users of the network unless authorised. This provides an element of privacy and integrity.
5. Resilience: The system is able to recover after peer and network failures and can suitably adjust to new peers joining network.

Several systems have already tried to encapsulate these ideas into peer to peer storage infrastructures. Such systems allow a peer to represent both server and client roles. These systems include the likes of Silverback [2], SFS [3], JungleMonkey [4], DistribNet [5] and OceanStore [6], but in some aspects each has failed to address all the requirements listed above. For example, Jungle Monkey only makes use of fragmentation to transfer the host file to the client so this can be seen as reducing availability. Distribnet fails to maintain user security as peers can read cached information therefore not providing substantial privacy. The initial scope for the creation of DFS was to construct a system, which would comply with all aforementioned requirements. With these properties incorporated its uses can be extended to disaster recovery, large file hosting and local file sharing.

2. Decentralised File System (DFS)

The system allows users to delegate the storage of files to participating machines in a fully decentralised peer network. The benefit of this system is it provides greater availability and resilience at equal redundancy levels of storing mirror images. This feature of the system allows the end user to reduce the large costs associated with generating and storing large amounts of data such as purchasing SAN/NAS devices or larger hard-drives. As the system is fully decentralised, the user can host files without depending on a specific machine in the system as information is fragmented and stored on peer's computers. This allows the user to be able to recover the files even if the users own computer is not functioning. The DFS has been designed with pluggable modules so that each user can be using different modules but still retain the same basic functions mentioned below. These different features can include the identifier for the file and file fragmentation parameters. The system has been designed, initially, on the basis of trust. The system can therefore be used in existing secure environments such as sub-nets where it is known that users will not intentionally abuse privileges granted. As such no mechanisms for monitoring and restricting of publishing have been included although to exist outside of a trusted relationship, this issue would have to be addressed. One solution would be the use of a marketplace scenario. As one peer hosts a fragment of a particular size, he is allowed to publish a file of determined size.

The methods available to the DFS are:
1. Publishing—publishes a file and stores it under a unique file identifier such as CRC.
2. Unpublishing—unpublishes a file from a given file identity.
3. Retrieval—retrieves a file from a given identity.

Through the use of only these three options, only the latest publication exists on the network structure. Since the main aim of the design of DFS was to minimise the amount of digital information whilst also providing reliability, the agents carrying the fragments of the any document published previously will terminate. It is possible to destroy indexing and leave fragments in the system. Possible solutions to this include a time to live mechanism being associated with the fragment or an agent (automatic process) to travel the peer network searching for obsolete fragments. The latter solution would be optimum to reach fragments that might not have received the termination request as out with the peer network at the time of the deletion command.

A graphical user interface integrates the local file tree structure and the network file structure into one view so in an instance a user can determine the status of a file. There have been four circumstances identified for the existence of a file:
1. Local—exists solely on the local hard disk.
2. Network—exists solely on the peer network.
3. Identical—the copy found on the local file system is an exact copy of the image fragmented on the network
4. Updated—the file on the local file system has been updated since the file was published to the network.

With the system being able to relate between the local file system and the network file system this means that the user doesn't have the problem of remembering specific file identities. For the purpose of this implementation, the networked data is stored in a single flat file, which itself can be distributed within the peer network. This means that the local file system can be recovered in its entirety using only a single file identifier. This feature addresses the very important issue of usability and reduces the amount of interaction required from the user to maintain functionality.

3. Security—File Identification

The implemented scheme for file identification is a 32-bit cryptographic checksum. This 4-byte number is generated on the contents of the file and is impossible to replicate the contents of a file to produce the same two checksums. In this way, the filename becomes obscured which means peers hosting the fragment have no idea what is contained within the fragment. Secondly, it enhances the security aspects of the system as if a fragment is tampered with and managed to recompile then the two checksums would not be identical. Another example is using a 160-bit SHA-1 hash where the probability of two objects having the same value would be 1 in $10^{20}$[6].

4. Persistence—Erasure codes

To achieve this fragmentation, the system has moved away from complete image replication, towards the use of erasure codes. Through the use of these codes, high availability and persistence can be achieved without adding excessive amounts of redundant information to the system [7]. These erasure codes allow the file to be broken up into n blocks and encoded into kn fragments where k>1. The file can then be reassembled from any k fragments. This offers a significant advantage in a network of transient peers, since only k of the selected peers need to be available to allow file retrieval and no specific sub-groups need to be intact. Through the user's preference, the parameters of n and k are modified to achieve the appropriate degree of redundancy and reliability. The type of erasure code used in the system to transform the file is the Vandermonde FEC algorithm [8].

5. Performance

Although using erasure codes increases the availability and time a document can exist in the network, it creates further problems: The location of fragments and the retrieval of the fragment data. This is accomplished with the use of two further technologies. DIET—a lightweight, decentralised and scalable toolkit for mobile programs in peer to peer networks. This provides us with the capabilities of using agent based systems for constructing peer to peer neighbour in the small world sense and distributing fragments to selected peers environments [9]. SWAN—a system of self-organising indexes supporting pervasive access to dynamic resources in decentralised networks. This allows us to assign global identifiers to fragment agents so they can be easily located in an Euclidean based model [10].

Using these two systems, a further benefit is complete anonymity. This means that not only is the published file contents and name obscured from other peers but also the identity of the publishing and retrieving peer.

6. Conclusions and Further Work

This paper gives an overview of the functions and architecture of the decentralised file system. It has shown how the authors have provided solutions to the problems related to distributed data storage especially in the areas of redundancy, persistence, conservation, availability and recovery and how these differs from the previously constructed systems. DFS is especially focused towards usability and this can be shown through the minimum amount of knowledge required by the user to publish/retrieve files located in the peer network and the interactions required to operate the graphical user interface.

REFERENCES

[1] Rabin, M., "Efficient Dispersal of information for security, load balancing and fault tolerance," Journal of the association for computing machinery, Vol. 36, No. 2, April 1989, pp 335-348

[2] Weatherspoon, H., Wells, C., Eaton, P., Kubiatowicz, D., Zhao, B., "Silverback: A global-scale archival system", U.C. Berkeley Technical Report: UCB//CSD-01-1139, March 2000 http://oceanstore.cs.berkeley.edu/publications

[3] Fu, K., Kaashoek, F., Mazieres, D., "Fast and secure distributed read-only file system", OSDI 2000, http://www.fs.net/

[4] Carra, A., Helder, D., Mukesh, A., "Jungle Monkey: Bulk File Transfer", Distributed Systems, EECS No. 589, 1998. http://www.junglemonkey.net/papers.html

[5] Atkinson, K., DistribNet, http://distribnet.sourceforge.net/design.txt

[6] Weatherspoon, H., Rhea, S., Wells, C., Eaton, P., Geels, D., Zhao, B., "Maintenance-free global data storage", IEEE Internet Computing, Vol. 5, No. 5 September/October 2001 http://oceanstore.cs.berkeley.edu/publications

[7] Weatherspoon, H., Kubiatowicz, J., "Erasure coding vs. replication: a quantitative comparison", IPTPS 2002, March 2002 http://oceanstore.cs.berkeley.edu/publications

[8] Luby, M., Mitzenmachery, M., Shkrollahiz, A., Spielmanx, D., "Practical loss-resilient codes", ITW, Feb. 8-11, 1998. http://www.icsi.berkeley.edu/~luby/PAPERS/itw98.ps

[9] Hoile, C., Wang, F., Bonsma, E., Marrow, P., "Core specification and experiments in DIET: A decentralised ecosystem-inspired mobile agent system." http://lia.deis.unibo.it/confs/aamas2002/ix.jsp?key=accepted

[10] Bonsma, E., "Fully decentralised, scalable look-up in a network of peers using small world networks." Proc. 6th Multi Conf. on Systemics, Cybernetics and Informatics (SCI2002), Orlando, July 2002

APPENDIX II

Security And Authenticity

Further enhancements to DFS (decentralised File Storage)

In its initial design, DFS has limited security built in for the detection of a specific user.

In the scenario described below, User A publishes a fragment to storage node B. The only identity associated with the fragment is the File identifier which can theoretically be known by everybody if this is a shared file or a fragment has been placed on an untrusted node. With this File identifier, the User A can request events from the storage node including retrieve fragment but also delete. The current problem is with knowledge of the file identifier being so wide spread, what is to stop a malicious user C from issuing deletion commands on User A's fragment or even recovering all the fragments and attempting to crack the encryption. The system needs to build in authentication of users.

So how can we develop a system where the two nodes wanting to transact can authenticate each other?

The problem with peer to peer is only the Distributing peer should hold the secret key. This key should never be distributed and remain private. He shouldn't have to pass passwords as more than one storage node will have access to it.

Therefore when Node A distributes the fragment, he should also include a public key corresponding to his own private key. (Additional Element to be included when storing fragment). The down point of this is that the storage node will have to hold as many public keys as correspond to unique users.

It is the minimal system to secure all fragment retrieval and deletion commands.

If the system were to be built to incorporate file sharing then an additional parameter would also have to be included to identify the distribution status of the fragment.

For example the distribution status could be set to—distributed—in which case the authenticity of the fragment requester doesn't have to be validated by the DFS storage node (but the requester would still not be given deletion privileges).

Scenario

Peer A desires to initiate secure communication with peer B.
1. Peer A connects to peer B and announces its identity.
2. Peer B asks peer A to authenticate itself
3. Peer A can use the private key that corresponds to a public key that peer B holds to perform the same operation.
4. Peer B authorizes peer A to access certain resources by assigning privileges to peer A.
5. Before further communication takes place, the two peers can arrange to encrypt the channel connection between them probably by securing an ssl socket connection.

What is claimed is:

1. A method of identifying a predetermined number of computers within a computer network which satisfy one or more specified conditions, the method comprising:

communicating a request from an originating computer to one or more of the computers in the network a request message which includes said one or more specified conditions and a token value which is indicative of a number of computer devices to be located by the message;

receiving said request message at subsequent computers and at each subsequent computer which receives a request message processing the message, performing the following:

determining if it is able to satisfy the one or more conditions specified in the request message and if so, decrementing the token value within the received request message and identifying itself to the request originating computer, and then determining if the, possibly decremented, token value in the received request message indicates that at least one further computer device is required to be located and if so, forwarding one or more daughter messages on to a subsequent computer or computers within the computer network unless a restriction criterion has been met, wherein each daughter message includes said one or more specified conditions and a token value such that the token value if only one daughter message is forwarded, or the sum of the token values of the daughter messages if more than one daughter message is forwarded, equals the, possibly decremented, token value of the received request message.

2. A method as claimed in claim 1 wherein each message includes a number of further hops permissible as a restriction criterion and each time the message is newly received by a device it decrements the number of further hops permissible until it reaches zero whereupon the restriction criterion is deemed to have been met.

3. A method as claimed in claim 1, wherein each computer maintains a register of neighboring devices for the purpose of communicating request messages thereto together with a probability associated with each registered neighboring device and wherein these probabilities are used to determine to which neighboring device or devices a request message or messages is or are to be sent.

4. A method as claimed in claim 3 wherein a computer from time to time requests certain of its neighbors to re-register with other computers in dependence upon the probabilities associated with its registered neighboring computers.

5. A method of storing a data file in a computer network, the method comprising:

identifying a predetermined number of computers within a computer network using the method according to claim 1 generating a first plurality, corresponding to the identified predetermined number of computers, of erasure coded fragments from the data file such that any subset of the fragments which contains at least a smaller predetermined number of the first plurality of fragments can be used to recreate the data file; and transmitting each of the erasure coded fragments to a respective one of the identified computers for storage thereon;

wherein at least one of the one or more specified conditions is that the computer has sufficient storage space available for storing one of said fragments.

6. A method as claimed in claim 5 wherein each fragment is encoded before transmission to a respective identified computer.

7. A method as claimed in claim 5 wherein each fragment is transmitted together with the public key of a public/private key combination belonging to a user attempting to store the data file.

8. A method as claimed in claim 5 wherein the data file is first transmitted from a remote client device to a gateway computer which is on the other side of a firewall between the remote client device and the gateway server, the computer network within which the computers are to be identified also being located on the other side of the firewall to the remote client device.

9. A computer network comprising a plurality of computers having data connections such that each computer within the network can communicate with any other computer within the network provided both computers are running and correctly connected into the network, each computer within the network comprising:
- a request generator for generating request messages each of which includes a token value indicative of the number of other computers within the network to be identified by the message and one or more specified conditions which each identified computer is to satisfy; and
- a request processor for processing received request messages by:
- determining if it is able to satisfy the one or more conditions specified in the request message and if so, decrementing the token value within the message and identifying itself to the originator of the corresponding received request message, and then,
- determining if the, possibly decremented, token value in the request message indicates that at least one further computer is required to be located by the message and if so, forwarding the one or more daughter messages on to a subsequent computer or computers within the computer network, unless a restriction criterion has been met,
- wherein each daughter message includes said one or more specified conditions and a token value such that the token value if only one daughter message is forwarded, or the sum of the token values of the daughter messages if more than one daughter message is forwarded, equals the, possibly decremented, token value of the received request message.

10. A computer for forming part of a computer network comprising a plurality of computers having data connections such that each computer within the network can communicate with any other computer within the network provided both computers are running and correctly connected into the network, the computer comprising:
- a request generator for generating request messages each of which includes a token value indicative of the number of other computers within the network to be identified by the message and one or more specified conditions which each identified computer is to satisfy; and
- a request processor for processing received request messages by:
- determining if it is able to satisfy the one or more conditions specified in the received request message and if so, decrementing the token value within the message and identifying itself to the originator of the received request message, and then,
- determining if the, possibly decremented, token value in the received request message indicates that at least one further computer is required to be located by the message and if so, forwarding one or more daughter messages on to a subsequent computer or computers within the computer network, unless a restriction criterion has been
- wherein each daughter message includes said one or more specified conditions and a token value such that the token value if only one daughter message is forwarded, or the sum of the token values of the daughter messages if more than one daughter message is forwarded, equals the, possibly decremented, token value of the received request message.

* * * * *